United States Patent Office 3,108,140
Patented Oct. 22, 1963

3,108,140
PREPARATION OF ACETYLENIC GLYCOLS
Morton W. Leeds, Murray Hill, James P. Russell, Scotch Plains, and James F. Vitcha, New Providence, N.J., assignors to Air Reduction Company, Incorporated, New York, N.Y., a corporation of New York
No Drawing. Filed Dec. 31, 1959, Ser. No. 863,094
7 Claims. (Cl. 260—635)

This invention relates to the preparation of acetylenic alcohols and glycols. More specifically, this invention relates to a process for the preparation of primary and secondary acetylenic alcohols and a process for preparing acetylenic glycols.

The preparation of primary acetylenic alcohols such as propargyl alcohol is known in the art. Propargyl alcohol has been prepared by reacting aqueous formaldehyde and acetylene in the presence of a catalyst such as copper acetylide. The reaction proceeds by the following equations:

(1) $CH \equiv CH + HCHO \rightarrow HOCH_2 - C \equiv CH$
(2) $CH \equiv CH + HCHO \rightarrow HOCH_2 - C \equiv C - CH_2OH$ Equation 1 shows the preparation of propargyl alcohol while Equation 2 shows the preparation of but-2-yne-1,4-diol. The reaction will proceed under favorable conditions to give about 50 percent propargyl alcohol and 50 percent but-2-yne-1,4-diol. The preparation of propargyl alcohol by the above method has several disadvantages. Some of the more important are that relatively large amounts of but-2-yne-1,4-diol are formed and that since the reaction is conducted using aqueous formaldehyde, it is difficult to separate the propargyl alcohol and water to obtain propargyl alcohol which is anhydrous.

Therefore, it is an object of the present invention to provide a novel method for preparing anhydrous propargyl alcohol.

A further object of this invention is to provide a method for preparing primary and secondary acetylenic alcohols.

A still further object of the present invention is to prepare primary and secondary acetylenic alcohols from tertiary acetylenic alcohols.

Another object of this invention is to provide a method for preparing acetylenic glycols.

Additional objects and advantages of this invention, if not specifically set forth, will become apparent to one skilled in the art during the course of the following description.

Broadly, one embodiment of the present invention comprises the preparation of primary and secondary acetylenic alcohols by a two-step process starting with an acetylenic alcohol and an aldehyde. In the first step the acetylenic alcohol is reacted under unitable reaction conditions with the aldehyde in the presence of a catalyst to form an acetylenic glycol. The reaction proceeds by the following equation:

(3) 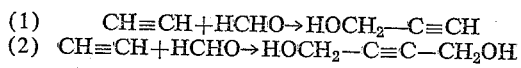

wherein $R_1$, $R_2$ and $R_3$ are members selected from the group consisting of hydrogen, alkyl, cycloalkyl, aryl, and aralkyl radicals. When the starting acetylenic alcohol is a tertiary acetylenic alcohol, that is where $R_1$ and $R_2$ are both radicals, rather than hydrogen, a mixed glycol will be formed. The term mixed glycol refers to the nature of the hydroxyl groups in the molecule. For example, in a mixed glycol one hydroxyl group may be tertiary and the other hydroxyl group may be either primary or secondary. With a mixed glycol, no two hydroxyl groups are of the same nature. In the preferred embodiment of the present invention the acetylenic mixed glycol contains a tertiary hydroxyl group and either a primary or a secondary hydroxyl group. It should also be noted that in addition to the above-described mixed glycol a mixed secondary-primary glycol can be formed by starting with a secondary acetylenic alcohol where $R_1$ or $R_2$ but not both are hydrogen, and formaldehyde is employed as the aldehyde in which case $R_3$ is also hydrogen. Also a mixed primary-secondary glycol can result where both $R_1$ and $R_2$ are hydrogen, i.e. a primary acetylenic alcohol, and $R_3$ is not hydrogen. Thus, it can be seen that by employing different combinations of $R_1$, $R_2$ and $R_3$ a variety of glycols that may be symmetrical, asymmetrical or mixed glycols may be produced. To illustrate by example, if a primary acetylenic alcohol such as propargyl alcohol is reacted with formaldehyde, a primary-primary glycol is formed and a symmetrical glycol results. Where propargyl alcohol is reacted with an aldehyde other than formaldehyde, then a primary-secondary mixed glycol will be formed.

The second step in the present invention comprises the alkaline cleavage of the glycol to form a ketone or aldehyde depending on the nature of $R_1$ and $R_2$ and a primary or secondary acetylenic alcohol depending upon the nature of $R_3$. The reaction proceeds as follows:

(4) 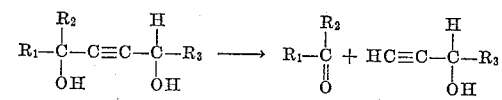

The present invention finds particular utility where the starting alcohol is a tertiary acetylenic alcohol which is reacted with formaldehyde since this will ensure formation of a mixed glycol which may be selectively cleaved to desirable products as will be more fully described below. With the starting glycol in reaction 4 above, where $R_1$ and $R_2$ are both radicals forming a tertiary hydroxyl and $R_3$ is hydrogen, a primary acetylenic alcohol will be formed on cleavage of the glycol; while if $R_3$ is other than hydrogen, a secondary acetylenic alcohol will be formed on cleavage of the glycol. It should be noted that the alkaline cleavage selectively occurs at the tertiary end of the glycol, splitting off a ketone and leaving a primary or secondary acetylenic alcohol.

The tertiary acetylenic alcohols which are utilized in the present invention correspond to the general formula:

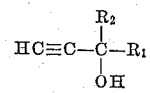

in which $R_1$ and $R_2$ are members selected from the group consisting of alkyl, cycloalkyl, aryl, and aralkyl radicals. The tertiary acetylenic alcohols can be prepared by various known methods such as those described in U.S. patent to Kreimeir No. 2,106,180 and to Vaughn No. 2,163,720. The tertiary acetylenic alcohols can be prepared, for example, through the reaction of an appropriate ketone with an alkali metal acetylide in liquid ammonia. Alternatively, the tertiary acetylenic alcohols can be prepared through the reaction of calcium carbide, potassium hydroxide, and an appropriate ketone. Other known methods such as the reaction of acetylene, a suitable ketone and potassium hydroxide in an inert solvent such as benzene can be employed in the preparation of acetylenic alcohols. Generally, the acetylenic materials produced by the above processes comprise a mixture of tertiary acetylenic alcohols and glycols. By adjustment of reactant ratios and reaction conditions high yields of either the alcohol or glycol may be obtained. Examples of some of the tertiary acetylenic alcohols which may be used are 2-methyl-3-butyn-2-ol (methyl butynol) and 3-methyl-1-nonyne-3-ol (methyl nonynol).

Aldehydes such as formaldehyde, acetaldehyde, crotonaldehyde, etc. may be employed in forming the glycol. In a preferred embodiment of the present invention an anhydrous aldehyde such as a linear polymer of formaldehyde is used. It is important in practicing the present invention that anhydrous conditions be observed in order to avoid formation of azeotropes with the water and thus facilitate separation of the desired products. Paraformaldehyde which decomposes to formaldehyde on heating is a suitable linear polymer of formaldehyde. Paraformaldehyde being anhydrous will produce a glycol which is anhydrous and which may in turn be cleaved to the anhydrous primary acetylenic alcohol, thus eliminating the troublesome separation of propargyl alcohol from water required in prior methods for producing propargyl alcohol.

The ratio of acetylenic alcohol to aldehyde which is reacted to form the glycol is not critical; however, it has been determined that a ratio of about 1 to 2 moles of the alcohol to 1 mole of the aldehyde will result in good yields. The amount of acetylenic alcohol used may be greater than about 2 moles to 1 mole of aldehyde; however, the yield does not generally increase with an increase in alcohol concentration.

Any of the conventional condensation catalysts such as alkali metal acetylides, heavy metal acetylides etc. may be employed in preparing the acetylenic glycols of the present invention; however, due to the explosive nature of the metal acetylides, it is preferred not to use them and where they are employed they should be deposited on a support such as carbon which decreases their susceptibility to detonation. In addition to the catalysts of the prior art, it has been found that a heavy metal oxide with the metal being selected from group IB of the periodic table including copper, silver, and gold may be employed in preparing mixed acetylenic glycols. It has been found that cuprous oxide is a very effective catalyst for this reaction and is a preferred catalyst. The employment of the heavy metal oxide is advantageous because it is not explosive as are many of the acetylides of the prior art. In order to decrease the hazard of explosion the acetylides are frequently used on a support such as activated carbon. The heavy metal oxides such as cuprous oxide may be employed without the necessity of utilizing a support or carrier. The amount of catalyst to be employed in the reaction is not critical as an amount of at least 0.1 percent by weight will catalyze the reaction. It has been found that when from about 1 to 2 percent by weight of cuprous oxide is employed as the catalyst, good results are obtained; however, larger precentages of catalyst may be employed although it does not appear that the percent conversion to the glycol will be increased by increasing the percent of catalyst above the level of about 2 percent by weight.

The temperature of the reaction is dependent upon the nature of the reactants to be utilized. The highest temperature is governed by the decomposition temperature of the acetylenic alcohol. The reaction should not be allowed to proceed at a temperature above the decomposition temperature of the acetylenic alcohol being reacted. The reaction will proceed at temperatures below about 100° C.; however, with these lower temperatures the reaction time is drastically increased, for example, it has been found that at a temperature of about 105° C. the reaction time for methyl butynol and paraformaldehyde is about 20 hours while the reaction time for the same reactants at a temperature of 130° C. is approximately 6 hours. Thus, the preferred temperature range is from about 130° C. to about 165° C. At these temperatures the reaction will proceed rapidly and the temperature will be low enough to prevent decomposition of the acetylenic alcohol. Where paraformaldehyde is employed, the temperature of the reaction must be maintained at least 100° C. in order to decompose the paraformaldehyde to formaldehyde.

While the alkali cleavage of the glycol may be conducted with symmetrical, asymmetrical and mixed glycols, the present embodiment of this invention is of particular importance to cleavage of mixed glycols formed from tertiary acetylenic alcohols. The cleavage of the tertiary-primary or tertiary-secondary mixed glycol is a selective cleavage, that is, the tertiary alcoholic group is selectively split off leaving the primary or secondary acetylenic alcohol. The cleavage is performed by heating the glycol under reduced pressure at an increased temperature in the presence of an alkali. It is preferred that the conditions employed (temperature and pressure) be such that the ketone and acetylenic alcohol which are formed during the cleavage are removed from the reactor as rapidly as formed. It is for this reason that a reduced pressure is employed. It is advantageous to remove the ketone and acetylenic alcohol as rapidly as formed to prevent a further cleavage of the acetylenic alcohol (particularly the secondary acetylenic alcohols) formed and also to prevent a reaction of the ketone with the alcohol. If a vacuum system is not employed, there is a tendency for further cleavage of the acetylenic alcohol to acetylene and aldehyde.

Any alkali may be employed to cleave the glycol. Examples of materials suitable for this purpose are the alkali metal hydroxides such as potassium, sodium, lithium, cesium, rubidium hydroxides, alkaline earth metal hydroxides such as magnesium, calcium, strontium, barium and radium and the mild alkaline compounds such as carbonates of the above alkali metals. We prefer to use a mild alkali such as potassium carbonate or sodium carbonate because of the ease of controlling the cleavage reaction when these materials are employed. Only trace amounts of alkali need be used as it has been found that 0.1 to 1 percent of potassium carbonate by weight of glycol will insure a good cleavage; however, the amount of alkali is not critical as much larger amounts may generally be employed. The cleavage of a primary acetylenic alcohol from the mixed primary-tertiary acetylene glycol will proceed with little difficulty due to the relative ease of tertiary acetylenic alcohol bond cleavage compared to the primary acetylenic alcohol bond cleavage. Primary acetylenic alcohols are very stable toward alkaline cleavage as compared to secondary or tertiary, this same stability reflects itself in splitting of mixed glycols. Where a mixed secondary-tertiary glycol is to be cleaved, the amount of alkali should be kept at a relatively low level, not above about 10 percent by weight of gycol, due to the fact that the secondary acetylenic alcohol is more easily cleaved than the primary acetylenic alcohol. The mixed tertiary secondary glycol will cleave selectively at the tertiary end; however, care must be exercised in order to prevent further cleavage of the secondary acetylenic alcohol.

The temperature at which the cleavage is performed is not critical and is dictated by the nature of the products of cleavage and the pressure employed. However, as indicated, care must be taken in order to prevent a further cleavage of the products, namely, the primary or secondary acetylenic alcohol which has been formed. It has been found that a temperature within the range of about 125 to 175° C. is preferred for most glycols.

A more complete understanding of the present invention may be obtained from the following examples.

Example 1

A one liter rocking bomb was charged with 2 moles of methyl butynol (168 grams), 3 moles of anhydrous paraformaldehyde (70 grams), 60 grams of catalyst consisting of 12 percent by weight of copper acetylide supported on activated carbon (1.65 percent coper acetylide by weight of reactant) and 200 cc. methylal. The bomb was heated to 105° C. for 30 hours. An exotherm was noted in the initial ½ hour of the reaction. The bomb was cooled and discharged, the mixture being filtered through a fine glass funnel, catalyst washed with methylal and the methylal solution combined with the filtrate. The filtrate was fractionally distilled to give 44 percent conversion based on formaldehyde of 2-methyl-3-pentyne-2,5-diol. The yield was 95.5 percent based on methyl butynol.

95 grams of the glycol (2-methyl-3-pentyne-2,5-diol) prepared above were cleaved employing 0.5 gram of potassium carbonate as a catalyst. The glycol-catalyst mixture was heated at 300 mm. pressure and a temperature of 175° C. Vapors were removed and condensed and the heating was continued for 5.75 hours. 71 grams of a yellow liquid were obtained. Upon distillation and analysis of the liquid it was determined that 10 grams were uncleaved glycol and of the 60 grams of cleaved glycol a 93% yield of both acetone and propargyl alcohol were obtained. The propargyl alcohol boiled at 116–117° C. at 750 mm. pressure and had a refractive index of $n_D^{20}$ 1.4308. The propargyl alcohol produced was substantially anhydrous and no major separation problems were encountered.

*Example 2*

A two-liter stirred autoclave was charged with 5 moles (420 grams) of methyl butynol, 2.5 moles (75 grams) of paraformaldehyde and 2 percent (10 grams) by weight of cuprous oxide. The charge was mixed in the autoclave and heated to about 130° C. for about 6 hours. The reactor was rapidly cooled and the residual pressure noted to be 20 p.s.i. The mixture from the reactor was filtered and the filtrate fractionally distilled to give 52.3 percent of conversion based on formaldehyde of 2-methyl-3-pentyne-2,5-diol. The mixed glycol (2-methyl-3-pentyne-2,5-diol) may be cleaved in a similar manner to that employed in Example 1 to produce anhydrous propargyl and acetone.

*Example 3*

A two-liter stirred autoclave was charged with 5 moles of methyl butynol, 2.5 moles of paraformaldehyde and 2 percent by weight of cuprous oxide. The charge was mixed in the autoclave and heated from 130° C. to 165° C. for 6 hours. The reactor was rapidly cooled and the residual pressure noted to be 35 p.s.i. The mixture was removed from the reactor, filtered and the filtrate fractionally distilled to give a 48 percent conversion based on formaldehyde of 2-methyl-3-pentyne-2,5-diol. The 2-methyl-3-pentyne-2,5-diol may be cleaved with potassium carbonate in a similar manner to that employed in Example 1 to produce anhydrous propargyl alcohol and acetone.

*Example 4*

A two-liter stirred autoclave was charged with 5 moles (770 grams) of 3-methyl-1-nonyne-3-ol (methyl nonynol), 2.5 moles (75 grams) of paraformaldehyde and 1 percent by weight of cuprous oxide. The charge was mixed in the autoclave and heated to about 130° C. for about 6 hours. The maximum pressure in the reactor was 40 p.s.i. The reactor was rapidly cooled and the mixture from the reactor was filtered and the filtrate fractionally distilled to give a 50 percent conversion based on formaldehyde of 4-methyl-2-decyne-1,4-diol which had a boiling point of 112° C. at 0.1 mm. pressure. The 4-methyl-2-decyne-1,4-diol may be cleaved by heating with potassium carbonate under reduced pressure to produce anhydrous propargyl alcohol and octanone-2.

We claim:

1. A process for the preparation of an anhydrous acetylenic glycol which comprises reacting anhydrous formaldehyde with an acetylenic alcohol having the formula

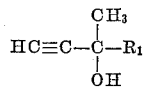

wherein $R_1$ is an alkyl radical, under anhydrous reaction conditions at a temperature of at least 100° C. and in the presence of a cuprous oxide catalyst.

2. A process for the preparation of an anhydrous acetylenic glycol which comprises reacting anhydrous paraformaldehyde with an acetylenic alcohol having the formula

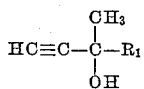

wherein $R_1$ is an alkyl radical, under anhydrous reaction conditions at a temperature of at least 100° C. and in the presence of a cuprous oxide catalyst.

3. A process for the preparation of anhydrous 2-methyl-3-pentyne-2,5-diol which comprises reacting 2-methyl-3-butyn-2-ol with anhydrous paraformaldehyde under anhydrous reaction conditions at a temperature of at least 100° C. and in the presence of a cuprous oxide catalyst.

4. A process for the preparation of anhydrous 4-methyl-2-decyne-1,4-diol which comprises reacting 3-methyl-1-nonyne-3-ol with anhydrous paraformaldehyde under anhydrous reaction conditions at a temperature of at least 100° C. and in the presence of a cuprous oxide catalyst.

5. A process according to claim 2 wherein the temperature is within the range from about 130° C. to about 165° C.

6. A process according to claim 3 wherein the temperature is within the range from about 130° C. to about 165° C.

7. A process according to claim 4 wherein the temperature is within the range from about 130° C. to about 165° C.

References Cited in the file of this patent
UNITED STATES PATENTS

| | | |
|---|---|---|
| 2,175,581 | Vaughn | Oct. 10, 1939 |
| 2,487,006 | Walker et al. | Nov. 1, 1949 |
| 2,871,273 | Behn | Jan. 27, 1959 |

FOREIGN PATENTS

| | | |
|---|---|---|
| 728,466 | Germany | Nov. 27, 1942 |

OTHER REFERENCES

Nikitin et al.: Chemical Abstracts, 47, 12,240 (1953).